United States Patent [19]

Sadr

[11] Patent Number: 5,417,167
[45] Date of Patent: May 23, 1995

[54] PLASTIC PALLET

[75] Inventor: Changize Sadr, Willowdale, Canada

[73] Assignee: Salflex Polymers Ltd., Weston, Canada

[21] Appl. No.: 25,460

[22] Filed: Mar. 3, 1993

[51] Int. Cl.⁶ .............................................. B65D 19/00
[52] U.S. Cl. ................................. 108/51.1; 108/901; 108/902
[58] Field of Search ..................... 108/51.1, 901, 902, 108/56.1, 56.3

[56] References Cited

U.S. PATENT DOCUMENTS

| | | | |
|---|---|---|---|
| 3,602,157 | 8/1971 | Cohen | 108/51.1 |
| 3,651,769 | 3/1972 | Foley. | |
| 3,678,868 | 7/1972 | Hirota. | |
| 3,878,796 | 4/1975 | Morrison | 108/901 X |
| 4,145,976 | 3/1979 | Svirklys. | |
| 4,230,050 | 10/1980 | Mays. | |
| 4,359,948 | 11/1982 | Judy et al. | |
| 4,385,564 | 5/1983 | Heggenstaller. | |
| 4,397,247 | 8/1983 | Lemelson | 108/901 X |
| 4,606,278 | 8/1986 | Shuert | 108/901 X |
| 5,101,737 | 4/1992 | Gomez | 108/901 X |
| 5,117,762 | 6/1992 | Shuert | 108/901 X |

FOREIGN PATENT DOCUMENTS

| | | | |
|---|---|---|---|
| 1278660 | 1/1991 | Canada. | |
| 2025672 | 3/1992 | Canada. | |
| 2101346 | 3/1972 | France | 108/902 |
| 2612153 | 9/1988 | France | 108/901 |
| 2241289 | 3/1973 | Germany | 108/901 |
| 9113810 | 9/1991 | WIPO | 108/901 |

OTHER PUBLICATIONS

"Excellence in Corrugated Pipe Production Systems" (Cullom).
Brochure by Olmas.

Primary Examiner—José V. Chen
Attorney, Agent, or Firm—Bereskin & Parr

[57] ABSTRACT

A shipping pallet of the type usually manufactured from wood is made of hollow plastic stringers and deck boards. The stringers and deck boards are made of plastic materials which may be either virgin plastic, recycled plastics or mixes. The stringers and deck boards are hollow but have closed ends to prevent entry of dirt, fluids, insects and vermin. The stringers and deck boards may be made in a blow molding process or using continuous extrusion and molding processes similar to that used in the manufacture of corrugated pipe.

Various connection configurations for affixing the deck boards to the stringers are described including fixation by screws as well as interlocking connections between the plastic parts themselves and the use of separate interlocking components which engage the deck board and stringers.

20 Claims, 9 Drawing Sheets

PLASTIC PALLET

FIELD OF THE INVENTION

This invention relates to a pallet construction, and in particular to a pallet having thin walled hollow members which are strong, lightweight and closed.

BACKGROUND OF THE INVENTION

Pallets have been constructed from a number of materials. The most common pallet in use today is manufactured from relatively cheap wood products. Typically the pallet will have two or more stringers and a plurality of deck boards extending transversely across the stringers. One or more deck boards may be attached to the lower surface of the stringers to provide suitable rigidity of the stringers.

Other materials have been utilized for the production of pallets. One example of a pallet is that shown in U.S. Pat. No. 4,145,976 which issued Mar. 27, 1979 (Svirklys), assigned to Extrados Company Limited. The pallet shown in that patent is of a knock-down type construction with a plurality of releasably interlocking parts. In order to provide improved strength, separate end caps are provided in each end of each stringer element with the end caps acting as part of the fastening arrangement of the end deck forming member. In this patent the deck members have relatively uniform cross-section at any point along their length and may be made from an extrusion procession.

Materials used for manufacturing pallets must be strong and rugged enough to serve the purpose of supporting the load to be carried on the pallet while also being relatively inexpensive. In order to have strong structures which are lightweight, it is desirable to have box structures rather than using solid members. However, in order to prevent a box structure from filling with liquids and solids such as mud, sand, gravel or other substances upon which the pallet may be placed or where the pallet may be stored, the boxed structures should be closed. While a boxed structure may be closed by the addition of caps, this then necessitates the need for constructing a separate member and affixing that member to the box structure.

It is therefore desired to provide a pallet made of thin walled hollow members which are closed. The members may be made from plastic. In particular, pallets of the type discussed are a particularly good use for recycled plastic materials. The pallet may be made from entirely recycled material or from mixes of virgin resin and recycled material. One of the advantages of such pallets is that the pallets, when damaged or broken, as will inevitably occur, may themselves be recycled to create new pallets. Thus, there are significant economies by the use of recycled material and by recycling damaged pallets or parts thereof.

Thin walled hollow members which are integrally closed may be manufactured using known blow moulding processes. Alternatively the use of continuous extrusion equipment similar to that used to produce corrugated or flexible piping may also be used to make closed structures for use in pallets in accordance with this invention.

SUMMARY OF THE INVENTION

In one aspect, the invention relates to a pallet of the type having at least two elongate stringers, a plurality of elongate deck boards extending generally transversely between said stringers, and means for connecting said deck boards to said stringers, the improvement comprising each of said stringers and each of said deck boards being of a closed, thin walled hollow construction.

DESCRIPTION OF THE DRAWINGS

Preferred embodiments of the present invention are described below with reference to the accompanying drawings in which.

DESCRIPTION OF PREFERRED EMBODIMENTS

Figure 1:
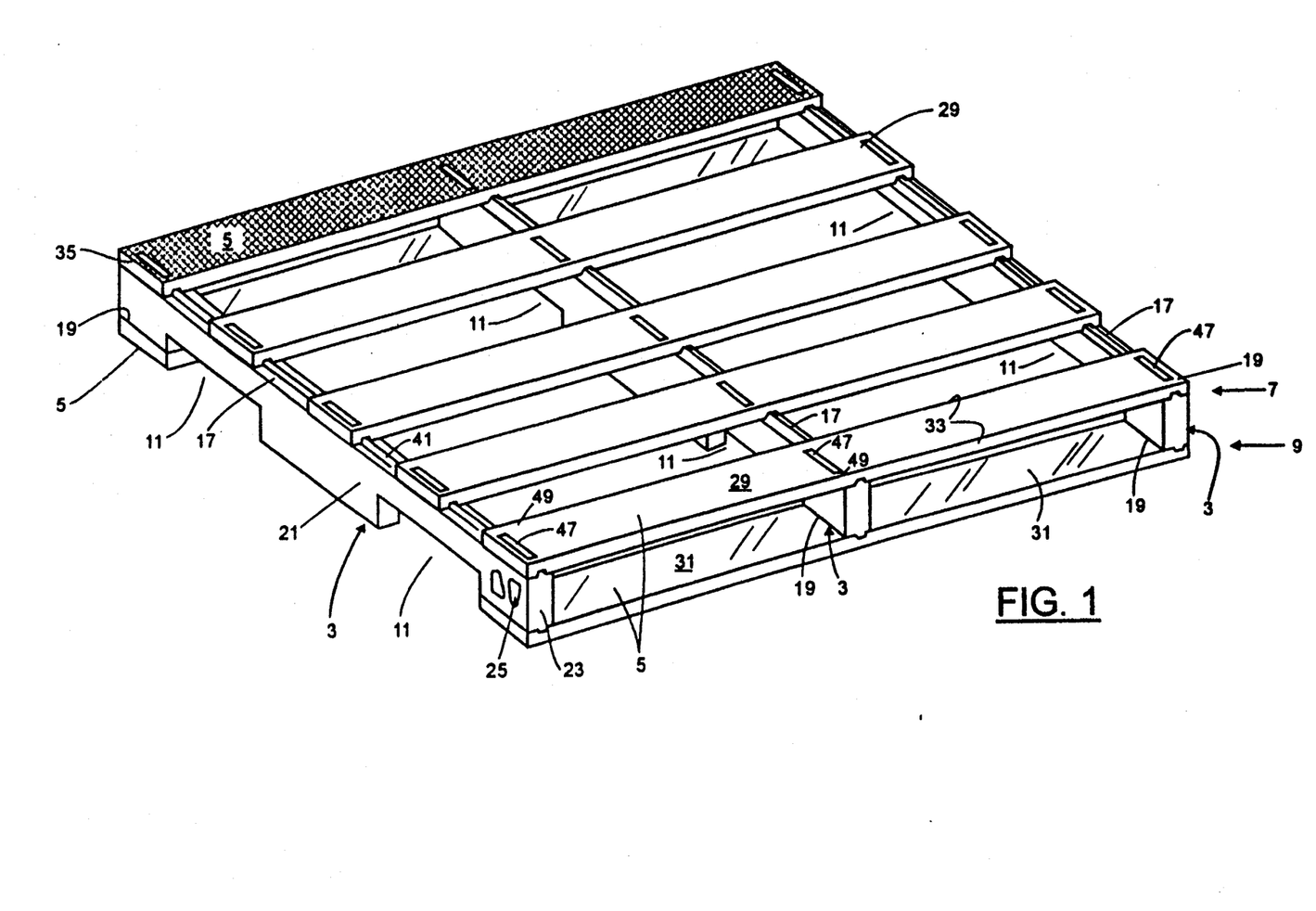
FIG. 1 is a perspective view of a pallet according to a first embodiment of the present invention.

Reference is first made to FIG. 1 which shows a pallet, according to a first embodiment of the present invention, generally indicated by reference numeral 1, The pallet 1 is of the type having elongate stringers 3 longitudinally arranged in a parallel, spaced apart relationship, and having top and bottom layers 7 and 9 of elongate deck boards 5 extending generally transversely between the stringers 3. Hence, the pallet 1 of the first embodiment is sometimes termed a "double-deck" pallet.

In the first embodiment, two stringers 3 are provided at each end of the pallet 1 and a third stringer 3 is located intermediate the end stringers to enhance the flexural stiffness of the boards 5. The number of stringers 3 may be varied according to the size and strength of pallet 1 required, with attendant modifications to the deck boards 5 as will be discussed below. Likewise, the number of deck boards 5 in the top layer 7 may be varied depending on their size (i.e. width) and the strength requirements of the pallet. It is well understood that, in the first embodiment, each board 5 in the top layer 7 acts as a load carrying member to transfer load to the stringers 3, whereas each board 5 in the bottom layer 9 braces the stringers 3 to stabilize them and to resist collapse of the pallet.

The pallet 1, and in particular each stringer 3, is provided with openings 11 for accepting the tines of a fork-lift vehicle, or the like.

Figures 2, 3:
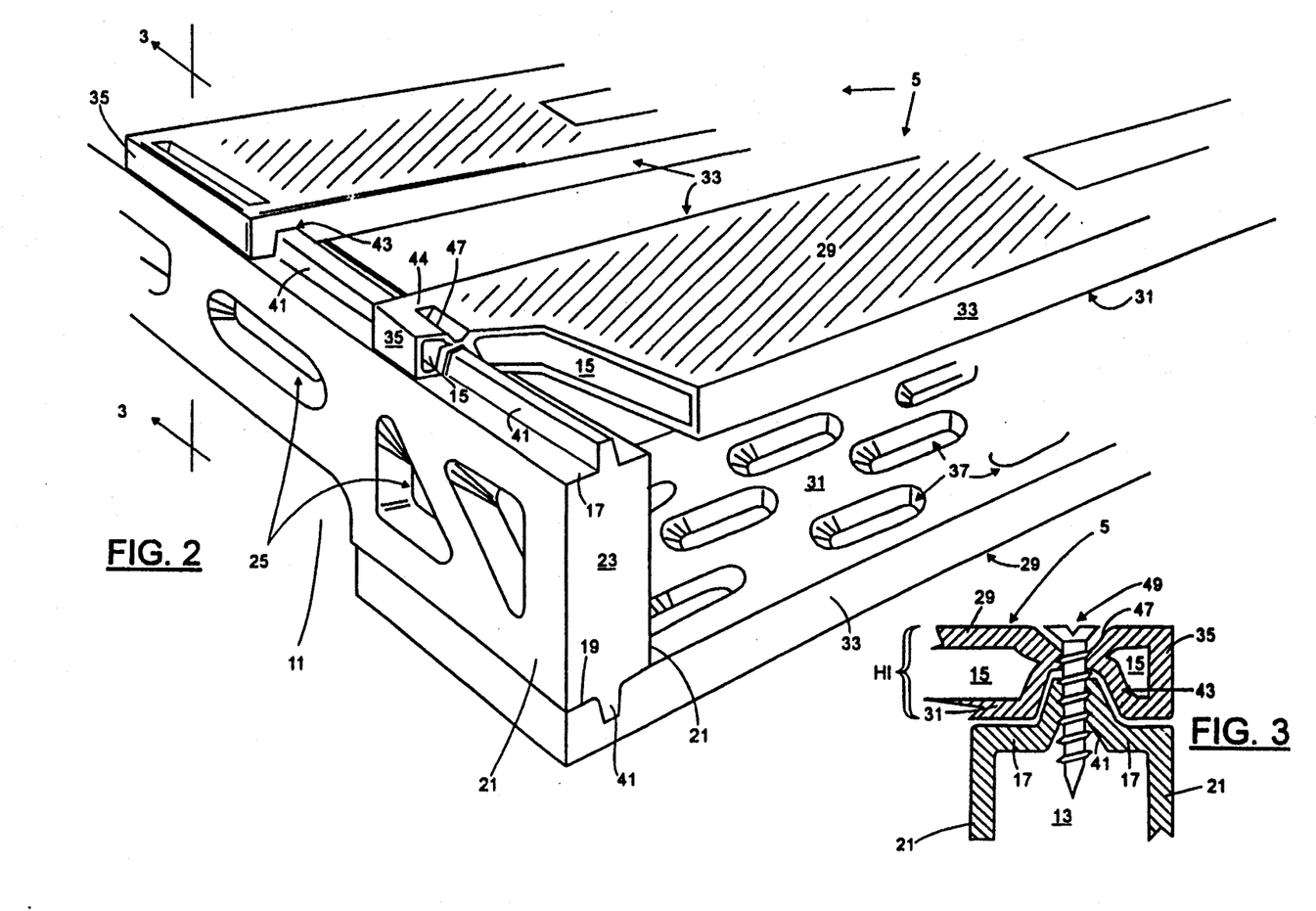
FIG. 2 is a close-up perspective partially broken away view of the pallet of FIG. 1.
FIG. 3 is a partial cross-sectional view along the line 3—3 in FIG. 2.
Figure 4:
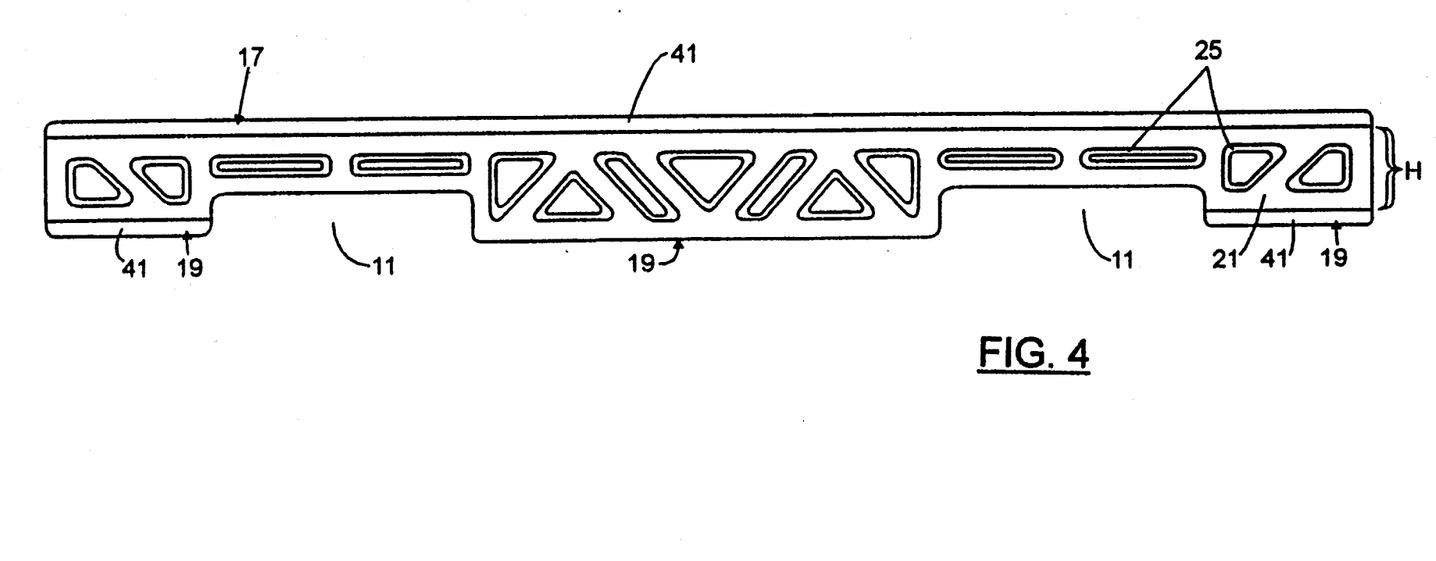
FIG. 4 is a side elevational view of a stringer according to said first embodiment shown in FIG. 1.

Referring now to FIGS. 2–4 as well, each of the stringers 3 and deck boards 5 are of a thin-walled hollow construction having inside spaces 13 and 15, respectively, which are closed to the ambient. Preferably, the stringers 3 and boards 5 are produced by a moulding process such as those described below. Good results have been achieved in said process using non-cellulosic and non-metallic, recyclable materials, such as thermoplastic polymers. The use of such materials in combination with the hollow construction of the present invention produces stringers and boards which are sturdy and durable, yet lightweight as well. Furthermore, the stringers and boards may be readily recycled if they are damaged, for example. These and other advantages of the invention are discussed below.

Each stringer 3 is generally rectangular in cross-section, having spaced apart top and bottom surfaces 17 and 19 and a web portion therebetween comprising spaced side walls 21 extending generally vertically between respective edges of said surfaces 17, 19. The surfaces 17, 19 and side walls 21 form a perimeter of the inside space 13. Each stringer 3 is closed at its ends by integral end walls 23, and so the space 13 is sealed from the ambient.

To strengthen the stringer 3 without adding any significant quantity of material thereto, the opposite side walls 21 meet to form first discrete areas of double wall thickness 25. The configuration and location of the first discrete areas 25 has a dual purpose: firstly to lessen the chance of the side walls 21 bowing or buckling under load, thereby strengthening the stringer 3; and secondly to leave a continuous inside space 13 between the ends 23 so that the stringer 3 may be moulded effectively. The double wall portions of the discrete areas 25 may be located at any point intermediate the side walls 21; good results have been obtained by locating the double wall portions about midway between the side walls 21, otherwise the material which forms one of the side walls 21 is stretched more than the material on the opposite side wall. It will be appreciated that the double wall portion 25 need not always be the thickness of the two opposite side walls 21 combined. The thickness of the double wall portion will depend on the configuration of the mould.

The deck boards 5 have a generally similar construction as the stringers. Each deck board 5 is generally rectangular in cross-section, having generally planar top and bottom members 29 and 31 and spaced side walls 33 extending generally vertically between respective edges of said members 29, 31. Hence, the top and bottom members 29, 31 and the side walls 33 form a perimeter of the inside space 15. Each board 5 is closed at its ends by end portions 35, and so the space 15 is sealed from the ambient.

It is also understood that "top" and "bottom" are used herein as terms of reference. For instance, the "top" member 29 of the board 5 is the load bearing member. When the board 5 is placed on the top layer 7, the top member 29 carries the load of whatever is placed on the pallet 1. The same board 5 may be flipped around and placed in the "bottom" layer 9 (see FIG. 2, for example) wherein the top member 29 now transfers the load from the pallet 1 to the flat surface on which the pallet sits.

To strengthen the boards 5, the top and bottom members 29 and 31 meet to form second discrete areas of double wall thickness 37. The configuration and location of the second discrete areas 37 is arranged to lessen the chance of the members 29, 31 bowing out or buckling under load, and to leave a continuous inside space 15 between the ends 35 so that the board 5 may be moulded effectively. The double wall portions of the second discrete areas 37 may be located at any point intermediate the members 29 and 31, although it is preferred that the double wall portion 37 be located adjacent the top member 29 so that the top member 29 remains relatively flat.

The pallet incorporates a means for connecting the deck boards 5 to the stringers 3, which includes a means for positively locating each of the boards 5 on the stringers 3. The locating means comprises first locating portions 41 on each of the top and bottom surfaces 17, 19 of the stringer 3 which are adapted to mate or cooperate with second locating portions 43 on the deck boards 5 to prevent movement of the boards 5 transversely off the stringers 3.

In the first embodiment, the first locating portion 41 is in the form of a land which protrudes from each of said top and bottom surfaces 17, 19. Preferably the lands 41 are integral with the surfaces 17, 19 and are formed therewith during the moulding process. The land 41 on the top surface 17 extends continuously across the entire length of the stringer 3 to accommodate any desired spacing of the boards 5 on the top layer 7. However, the lands 41 may take a variety of forms. One form may be a repeating pattern of discrete lands 41 to limit or preset the choice of spacings for the boards 5. Another form may be two or more spaced, parallel rows of lands 41 provided on each surface 17, 19 (of course the second locating portions 43 would have to be changed to fit the configuration of the lands 41). The number of rows of lands would likely be limited to two or three due to the width and thickness of the surfaces 17, 19. Yet another form of land may be a plurality of discrete button shapes spaced along the length of the stringer 3, versions of which are discussed below for alternate embodiments of the pallet.

The bottom surface 19 of the first embodiment has only two lands 41, one at each end of the stringer 3. Each land 41 extends only between the end wall 23 and the first closest opening 11 to accommodate a single deck board 5, and does not extend along the segment of the bottom surface 19 between the openings 11 (indicated by the reference numeral 45 in FIG. 4). Hence, the height "H" (see FIG. 4) of the side walls 21 along segment 45 may be increased by about the height "Hi" (see FIG. 3) of the deck boards 5 to enhance the flexural strength of the stringer, and to ensure that the pallet 1 sits flat when it is stacked on a floor or on another pallet, for example. In alternate embodiments of the stringer 3, the land 41 may be provided along the segment 45 (consequently, the height of the side walls 21 along this segment should be kept at H to accept further boards 5 in the bottom layer 9). It is preferred that the land 41 not extend around the openings 11 to maximize the size of the opening.

The second locating portions 43 in the boards 5 comprise grooves formed in the bottom member 31 which extend transversely across the width of the deck board 5 for fitting onto the lands 41. Each groove 43 is integral with the bottom member 31 and is formed therewith during the moulding process. As shown in FIGS. 2 and 3, the groove 43 meets the top member 29 to form a third discrete area of double wall thickness intermediate the top and bottom members 29, 31, thereby forming a channel 47 in the top member 29. The channel 47 does not extend to the side walls 33 of the board 5, thus creating a passage (indicated by 49) between the inside space 15 adjacent the end portion 35 and the inside space 15 in the rest of the board 5 for air communication during blow moulding.

In the FIG. 1 embodiment, the groove 43 (and the companion channel 47) is located at each end of the boards to mate with the stringers at each end of the pallet. Preferably, the board's end portions 35 line up with the outside side walls 21 of the stringer (as viewed in FIG. 3), otherwise any end portions 35 sticking out beyond the side walls could be prone to breakage, for example by being caught on other objects during transport. Each board also has a groove 43 (and channel 47) situated intermediate its ends to mate with the third stringer in the middle of the pallet.

The means for connecting the deck boards 5 to the stringers 3 further includes a means for fastening the boards to the stringers. In the first embodiment, the fastening means comprises a threaded screw 49 for insertion into the channel 47 in the manner shown in FIG. 3 to fasten the groove 43 to the land 41. The screw 49 may be of usual construction and material, such as metal, or any other appropriate material, especially a recyclable material. Although a single screw 49 placed in each channel 47 is likely adequate to prevent the board from dislodging off the stringer, the channel 47 is long enough to accept several screws if desired.

The board's outside or top surface (i.e. the surface of the top member 29 opposite to the inside space 15) is preferably scored or textured as shown in FIGS. 1 and 2 to provide an "anti-slip" surface.

An "anti-slip" surface on the top surface 29 is desirable for several reasons. When placing cartons and the like on the pallet the surface 29 may remain relatively slippery and there may be some tendency of the boxes or other material stored on the pallet to slip from the pallet during handling and the like. Similarly, where pallets are placed on hard slippery floors such as concrete or where pallets are stacked on top of either other pallets or other flat loads, there may also be a tendency of the upper pallet to slip along its supporting surface. In order to provide additional resistance to slipping, the top surface 29 may be provided with an area or several areas of anti-slip or non-slip material. In most cases it will only be required that the non-slip material be set out on the top surface 29 of the deck boards at either end of the pallet and advantageously on the deck boards which are fastened to the bottom of the stringers at either end. The areas of anti-slip surface may be made by placing into the mould, prior to the forming process, a non-slip material. The non-slip material is then incorporated into the molten plastic when the plastic is shaped in the moulding processes disclosed below. The area of non-slip material may be in the form of a longitudinal area extending substantially along the entire length of the deck board or in one or more smaller discrete areas. While of course such deck boards could be used throughout the whole of the upper surface of the pallet, provision of the anti-slip surface at either edge will likely satisfy the need for stability of the load on the pallet or the pallet on other supporting surfaces.

Some advantages of the present invention may now be better appreciated. Both the stringers 3 and the deck boards 5 are quickly and efficiently manufactured from recycled plastic, for example, using moulding process as explained below. The pallet 1 is then constructed by simply connecting both layers 7 and 9 of deck boards 5 to the stringers 3 using the screws 49. The spacing of the boards 5 in the top layer 7 will depend on the pallet's intended use (for example, closer spacing for anticipated heavy loads). The pallet may either be shipped by the manufacturer in an assembled form, or, in order to save shipping costs by economizing on shipping volume, the pallet may be shipped disassembled for final assembly by the end user. The sturdy, yet lightweight nature of the pallet (due to the hollow, thin walled construction) further economizes on transportation costs and makes it easier for the end user to manipulate the pallets. The closed configuration of the boards and stringers prevents the accumulation of dirt and vermin within the hollow spaces, thereby keeping the pallet lightweight.

In use, if any one of the individual elements of the pallet is damaged, it may be easily and quickly replaced by disconnecting the damaged element and replacing it with a new one. The damaged elements may then be shipped back to the manufacturer for recycling and remoulding into new pallet elements, for instance.

Alternate embodiments of the means of connecting the deck boards to the stringer are presented below.

Figure 5:
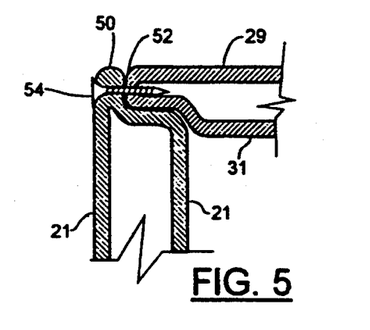
FIG. 5 illustrates a first structure for attaching a deck board to a stringer.

FIG. 5 illustrates an alternate method for attaching a stringer 3 to deck board 5. In FIG. 5 the stringer 3 and deck board 5 are shown in cross-section. In this embodiment the stringer 3 includes a rib 50 of substantially solid material at the upper edge of the stringer 3. The deck board 5 is configured to have a wall 52 which in use is placed vertically adjacent the upstanding rib 50. With the deck board held in place as illustrated in FIG. 5, a screw 54 may be driven through the rib 50 and the wall 52 of the deck board 5 thus permanently attaching the deck board to the stringer. Replacement of the deck board is achieved by removing the screw 54. While only one screw 54 is shown in the cross-section of FIG. 5, it will be appreciated that two or more screws may be used depending upon the width of the deck board and the desire of the designer.

Figure 6A:
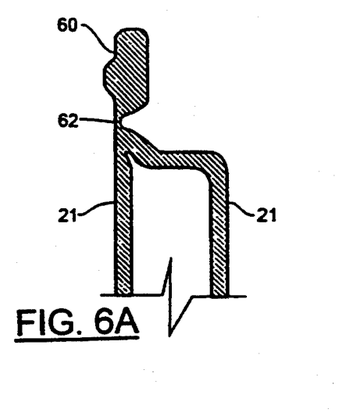
FIGS. 6A and 6B illustrate an alternative structure for attaching a deck board to a stringer.
Figure 6B:
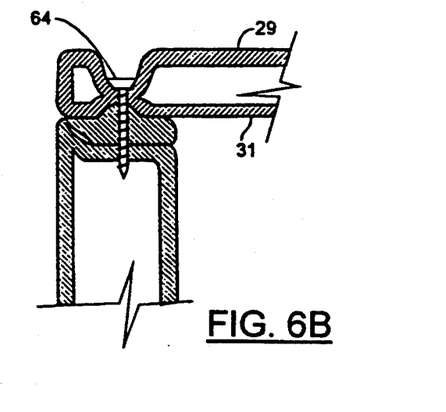

FIG. 6 illustrates an alternate system for attaching the stringers 3 to the deck boards 5. In this configuration the stringer 3 is configured to have an upstanding rib 60 at the upper surface thereof. The rib 60 comprises a living hinge 62 so that the rib 60 may be folded about the walls 21 of the stringer to assume a substantially horizontal position. As shown in FIG. 6B the deck board 5 may be of a configuration similar to that shown in FIG. 2. In this configuration the channel 47 may be used to house a screw aligned in the vertical direction. The screw 64 thus passes through the base wall of channel 47, through the rib 60 and also through the upper wall of the stringer 3 to affix the deck board 5 to the stringer 3.

The connections shown in FIGS. 5 and 6 show the attachment of one deck board to the upper surface edge of the stringer. The same configuration or any of the alternatives can be used at the lower edge of the stringer for attaching what become the lower deck boards. There is no need to use the same attachment means at both upper and lower surface edges of the stringers and any combination of the various attachment systems may be utilized as desired. However, it is obviously more efficient from production purposes if the same type of connection system is used in both locations so as to eliminate the need for a multiplicity of different parts.

If an entire damaged pallet is shipped to the manufacturer, the efficiency of the recycling procedure is hampered if non-recyclable screws (for example metal screws) are present since such screws must be separated from the pallet's recyclable elements at some point in the recycling process. Hence, alternate embodiments of the pallet are presented below which omit the use of such screws.

Figure 7:
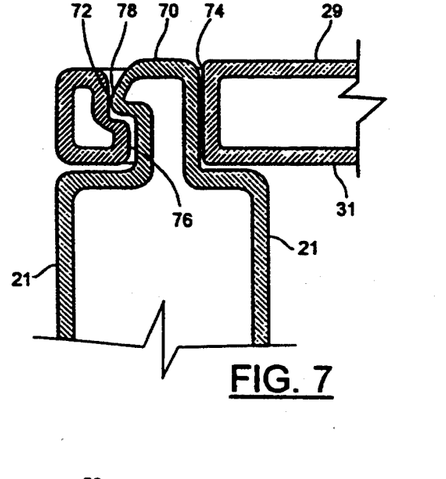
FIG. 7 illustrates a further alternative structure for attaching a deck board to a stringer.
Figure 8:
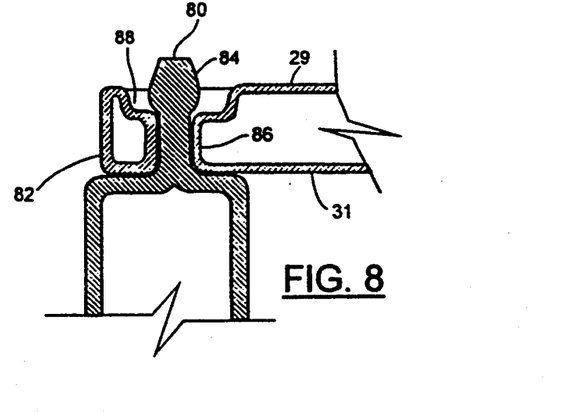
FIG. 8 illustrates a further alternative structure for attaching a deck board to a stringer.
Figure 9:
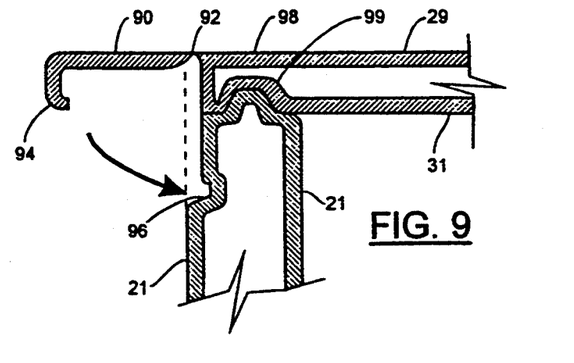
FIG. 9 illustrates a further alternative structure for attaching a deck board to a stringer.

FIGS. 7, 8 and 9 illustrate connections between deck boards and stringers in which there is no need to use screws.

In FIG. 7 the stringer 3 is provided with a generally upwardly projecting hollow rib 70. The rib 70 includes a hooked or barbed portion 72. The rib 70 is not a continuous member extending along the whole length of the stringer but rather is formed in discrete sections of a length slightly less than the width of the deck boards. The deck boards 5 are formed with a hole or slot 74 to receive the rib 70. The hole 74 comprises a narrowed portion 76 and a wider portion with a land 78. The barb 72 engages the land 78 to hold the deck board on the stringer. This provides a snap fit which is assembled by suitable pressure applied to the deck board against the stringer so that the rib 70 is deflected as it passes through the narrow portion 76 of the hole 74 until the barb 72 engages the land 78.

An alternate system involving heat staking is shown in FIG. 8. In this configuration the stringer 3 is provided with an upstanding barb 80 having a narrow shaft-like wall 82 and an enlarged head 84. The deck board 5 is provided with a hole or slot 86 and a recessed channel 88. In this configuration the deck board 5 is pressed over the barb 80 and the enlarged head 84 is then formed on the shaft. This retains the deck board with the head engaging the narrow portion of the hole 86 with the shaft-like portion 82 and the enlarged head 84 engaging the recessed portion 88.

FIG. 9 illustrates yet another type of joint in which the deck board 5 is provided with a longitudinally extending flange 90. The longitudinally extending flange 90 comprises a living hinge 92 and a barb 94. After assembly of the deck board to the stringer the flange 90 is bent about living hinge 92 until barb 94 engages the co-operating slot 96 in the wall 21 of the stringer 3. To help further locate the deck board with respect to the stringer the stringer may be moulded with a longitudinal rib 98 which engages with a co-operatively shaped groove 99 on the deck board.

Figures 10A, 10B, 10C:
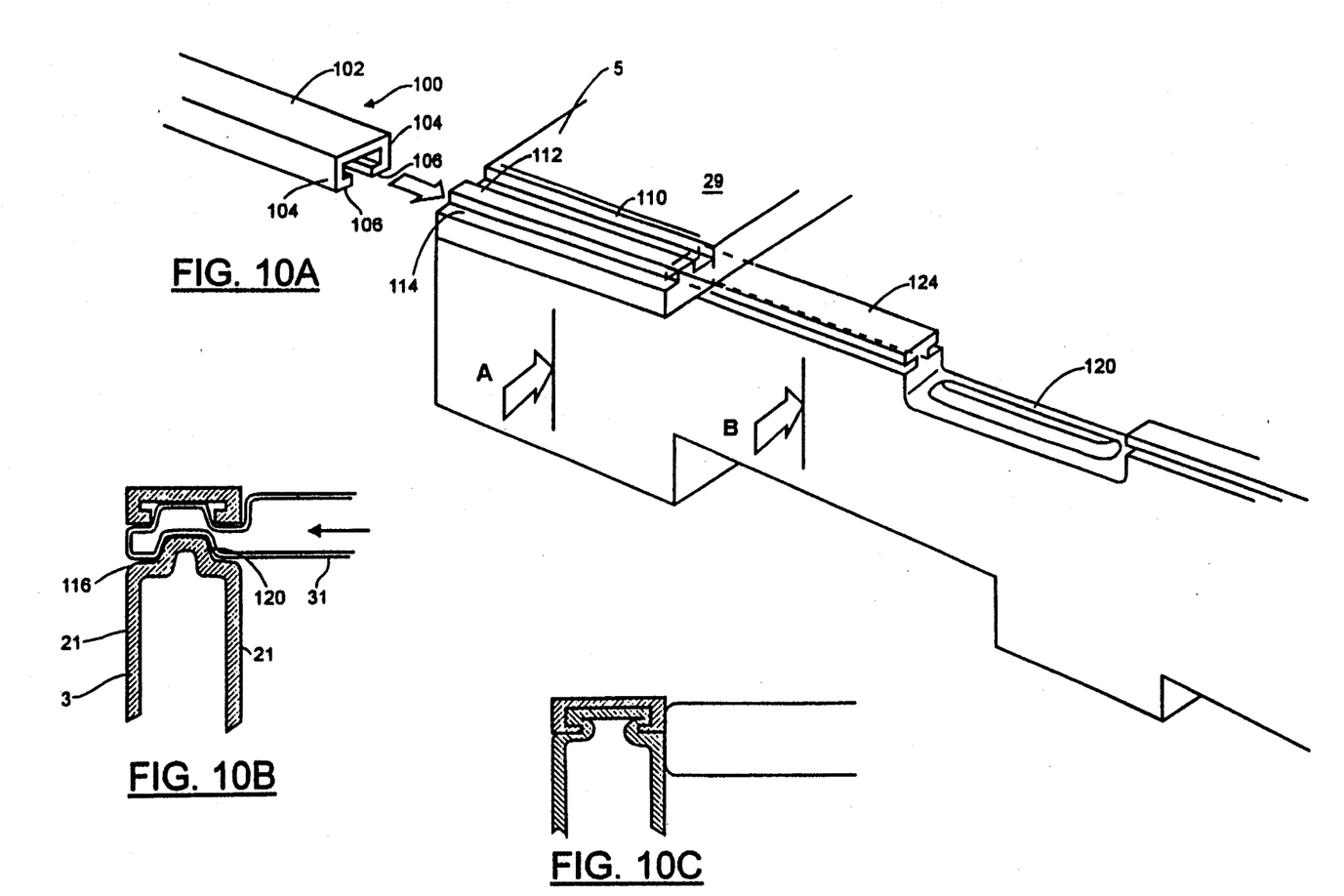
FIGS. 10A, 10B and 10C illustrate further alternative structures for attaching a deck board to a stringer.

FIG. 10 illustrates a further embodiment of the invention. In this embodiment a third component in the form of an elongated extruded interlocking member 100 is used to interlock the deck boards with the stringer. The interlock member 100 may be formed by extrusion and comprises a top flange 102, a pair of horizontal side flanges 104 and lower inwardly projecting flanges 106. The deck board 5 comprises a channel 110, a raised rib upstanding from the channel 110 shown in FIGS. 10 as 112 and a horizontal surface 114. The horizontal surface 114 is substantially aligned with tile base of the channel 110. The height of the raised rib 112 above the base of the channel 110 is approximately the same as the spacing between the lower inwardly projecting flanges 106 and the underside of the flange 102 of the interlocking member 100. As shown in FIG. 10A with the deck board assembled to the stringer, the interlock member 100 will contact the channel 110, the rib 112 and the surface 114 and thereby prevent any relative motion between the deck board 5 and the interlocking member 100.

The deck board 5 further comprises a channel 116 in its lower surface 31. The channel 116 is sized to closely fit the contours of a raised rib 120 on the stringer 3. The interaction of the channel 116 with the raised rib 120 precludes any horizontal motion of the deck boards relative to the stringer 3.

Intermediate the deck boards, the stringer 3 comprises a substantially T-shaped rib 124. The T-shaped rib 124 extends between the intended location for adjacent deck boards along the full length of the stringer. The T-shaped rib 124 aligns with the channel 110 of the deck boards as well as the rib 112 and the surface 114.

As shown in FIG. 10B the T-shaped rib 124 also closely receives the interlocking member 100. Accordingly, in order to assemble the pallet of this embodiment the stringer is positioned in its upright orientation. A plurality of deck boards are then placed on the stringer with the ribs 120 engaging the channels 116 of each deck board. When all deck boards are in place, the interlocking member 100 is then slid along the length of the stringer. The interlocking member 100 first closely engages the channel 110, the rib 112 and the surface 114 of the deck board and then closely engages the T-shaped rib 124. The lower inwardly projecting flanges 106 engage beneath the top of the T-shaped rib 124 and prevent any upward movement of the interlocking member relative to the stringer. The interlocking member 100 thus has a length substantially equal to the length of the stringer and interlocks all of the deck boards on to the stringer.

One of the advantages of this embodiment is that the deck boards may be easily replaced by simply sliding the interlocking member 100, removing the damaged deck board, substituting a replacement deck board and then passing the interlocking member back into its engaged position. If desired, relative motion between the interlocking member 100 and the stringer 3 may be restrained by any type of fastener or by engaging lugs or a clip at one end. If, by way of example, a screw is used to attach the interlocking member 100 to the stringers after the interlocking member is in place, then only one screw need be removed from each stringer to repair or reconfigure the pallet. More preferably, if a clip or lugs are used, they may be made from plastic which can be easily recycled.

FIGS. 11, 11A, 11B and 11C show a further embodiment in which the deck boards are retained on the stringers by interaction between locking barbs and slots and wedge configurations molded into the stringer and deck boards. In this embodiment, the stringer 3 comprises a longitudinally extending rib 140 which extends along the length of the stringer. The rib comprises a plurality of trapezoidal shaped sections 142. Intermediate each of the trapezoidal sections 142 there is a rectangular section 144. The trapezoidal sections 142 are spaced one from the other by section 144, a distance equal to the width of the deck board 5. On the upper surface of each of the trapezoidal portions 142 there is a locking barb 146A and 146B respectively. The locking barbs 146A and 146B are similar in that each is substantially wedge shaped with a ramp surface 148 and a substantially vertical locking surface 150. The two locking barbs 146A and 146B are different from each other to the extent that each one extends in the opposite directions, that is to say, numbers 146A and 146B are mirror images of each other in location.

Figures 11A, 11B, 11C, 11D:
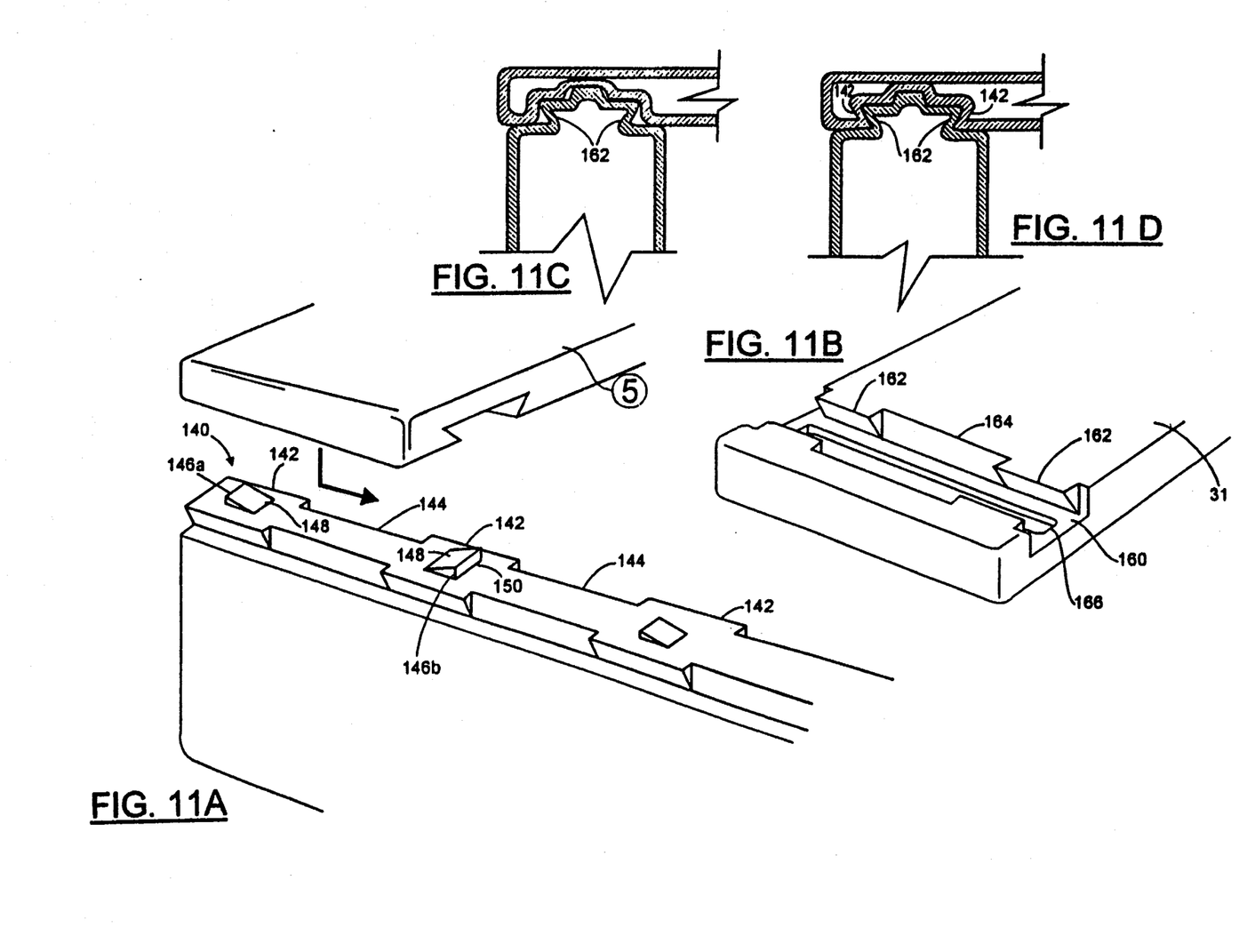
FIGS. 11A, 11B, 11C and 11D illustrate further alternative structures for attaching a deck board to a stringer.

As shown in FIG. 11A the underside 31 of the deck board 5 comprises a channel 160 which is intended to engage with the rib 140 of the stringer. The channel 160 comprises a pair of trapezoidal shaped sections 162 and a central rectangular section 164. The channel 160 further comprises a longitudinally extending trough 166 centrally located in the bottom of the channel 160.

In order to assemble the device of this embodiment, a deck board 5 is placed over a stringer. In order to first locate the deck board on the stringer the deck board is positioned so that the trapezoidal-shaped sections 162 are aligned with the rectangular sections 144. At the same time the rectangular sections 164 will be aligned with trapezoidal sections 142. The deck board 5 is then slid along the stringer so that the trapezoidal sections 162 align with and engage the trapezoidal sections 142, thus limiting any relative vertical motion between the deck boards 5 and the stringer 3. In aligning the trapezoidal sections 162 and 142, the trough 166 will slide up the ramped surface 148, slightly deforming the end of the trough 166 and/or the barb 146B. When in position with the trapezoidal sections 162 interlocking with the trapezoidal sections 142, the ends of the trough 166 will then engage the locking surfaces 150 of the interlocking barbs 146. Further horizontal motion of the deck board along the stringer is prevented by the ends of the trough 166 engaging with the locking surfaces 150 of the interlocking barbs.

Adjacent boards can be moved into position in the same manner with the final end board being slid in from the end.

FIG. 11B shows the relative location of the locking members of the deck board and stringer at a time when the deck board is not locked to the stringer. At the cross-sections shown in FIGS. 11C and 11D, the trapezoidal sections 162 are engaging with the trapezoidal sections 142 and the locking barbs 146 are located in the trough 166.

This interlocking barb system provides a strong joint without the need for screws. In order to disassemble this interlocking arrangement it is necessary to use a tool which is inserted beside the deck board and is used to pry up the edge of the deck board in order to disengage the trough 166 from one of the interlocking barbs 146A or 146B. Once the disengagement has been arranged by deforming the deck board by means of the tool, the deck board can then be slid off and a new deck board can then be placed on the stringer as necessary. The deck board which has been deformed by use of the disassembly tool will in most cases have already been damaged which resulted in the desire for disassembly and can then be returned for recycling.

The pallet of this invention can thus be assembled through a number of deck joints using screws interlocking third members or by configuring various joint arrangements to provide secure assembly.

All of the deck boards and stringers illustrated in the embodiments discussed above may be made in a number of different processes. A particularly useful process is that conventionally known as blow molding.

In blow molding a plastic object, a mold of a desired shape is provided. A parison of suitable thermal plastic is placed in the mold; the mold is closed, and air under high pressure is blown into the parison to produce an object having the desired shape. An example of a blow mold is illustrated in Canadian Patent No. 1,278,660, which issued on Jan. 8, 1991 to ABC Group, the disclosure of which is herein incorporated for reference. Blow molded objects are of a wide variety from toys to bottles to automotive parts because the process is relatively fast and inexpensive. Blow molded plastic objects are typically lightweight as compared to similar objects made from metal, wood or ordinary extruded plastics. The blow molding process is particularly useful in this example as it produces the closed parts which are an essential feature of this invention. The stringers and deck boards are produced as closed structures and thus water, dirt or other objects or animals or insects or the like cannot enter into the interior of the molded parts. The molded parts can be made as strong as desired and yet remain lightweight. The blow molding process may also be conducted using virgin resin or mixtures of virgin resin and recycled resin or entirely from recycled resin. Thus, the blow molding process is an ideal way of manufacturing the components for the pallet of this invention.

An alternate method for producing parts for the pallet of this invention is to use an extrusion process. An extrusion process of a continuous type has been widely used to produce corrugated plastic pipe and the like. Machines suitable for producing corrugated or flexible piping are available from manufacturers such as Corma Inc. or Cullom Machine Tool & Dye Inc. Machines are also available under the trade mark OLMAS.

Figure 12A:
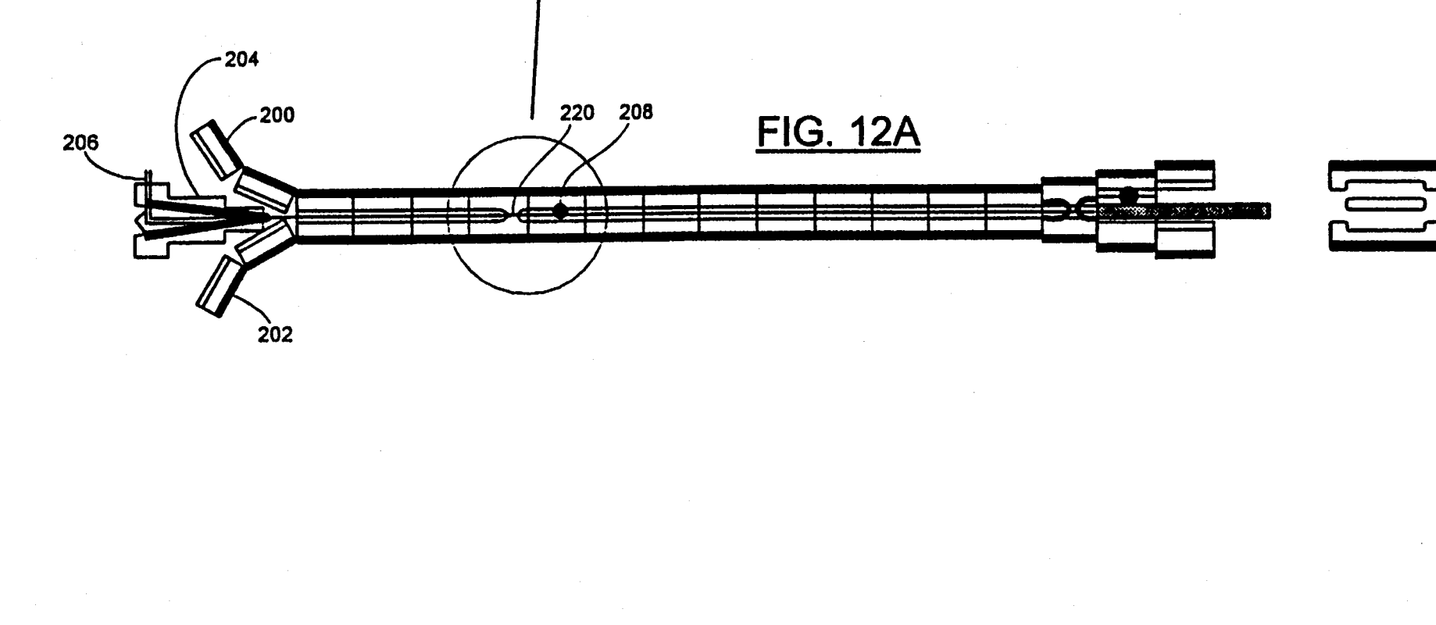
FIGS. 12A and 12B illustrate a machine for manufacturing components in accordance with the invention.
Figure 12B:
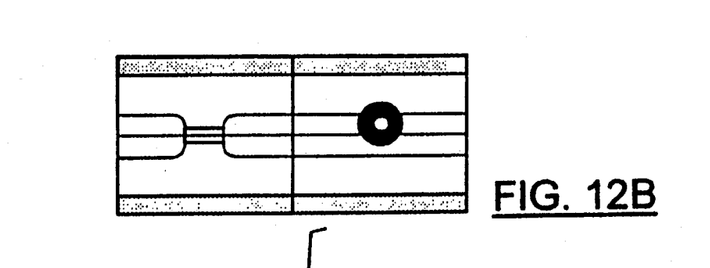
Figure 13:
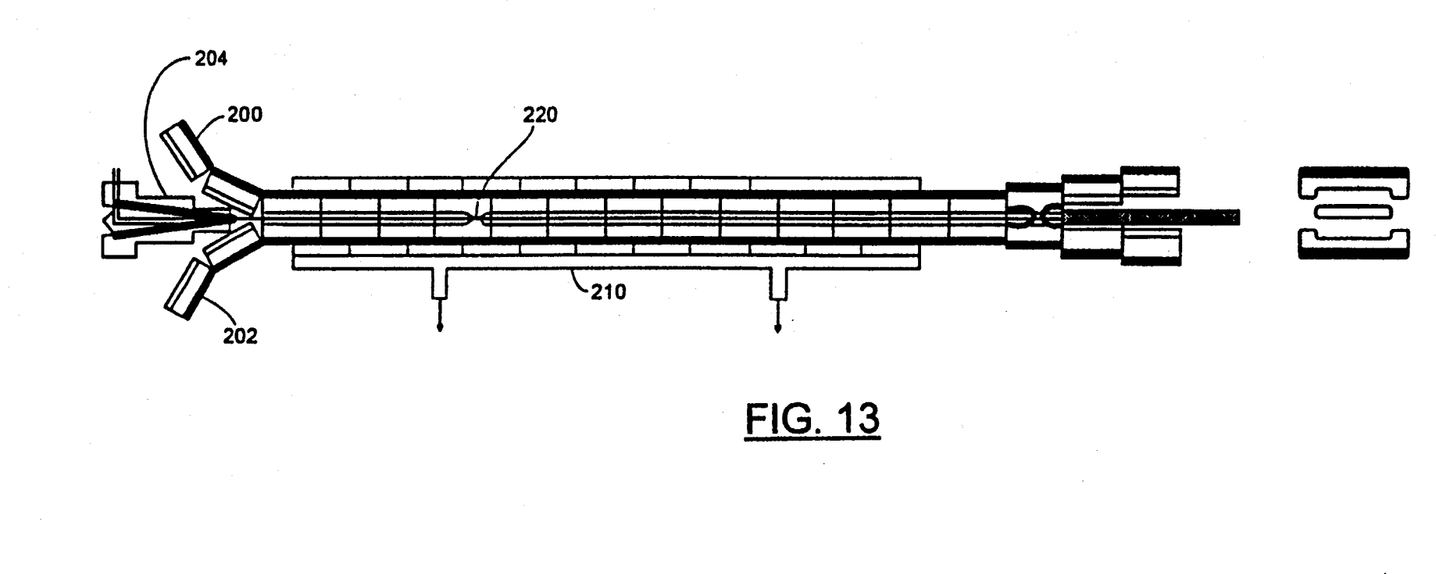
FIG. 13 illustrates a machine similar to FIG. 12 using vacuum assist.

Machines used in the manufacture of corrugated plastic pipes may be readily modified to manufacture deck boards and stringers for assembly into the pallet of this invention. Such machine is shown schematically in FIGS. 12 and 13. The machine of FIG. 12 uses internal pressure similar to blow molding while the machine of FIG. 13 is otherwise similar but utilizes vacuum assist in the forming operation. The machine comprises series of pairs of clam shell halves 200 and 202. The clam shell halves are brought together around an extrusion head 204. The plastic material leaving the extrusion head is hollow and virtually molten. Air support through air under pressure is provided at 206. The material may be easily formed as the closed clam shell halves travel along the run of the machine. As the clam shell halves travel along the lower run they are subjected to positive air pressure as shown at 208 in FIG. 12A and expanded in FIG. 12B or an external vacuum as shown by vacuum jacket 210 in FIG. 13. The differential in pressure between the inside of the material extruded through the extruding head and the external ambient or vacuum permits forming of the material into any configuration similar to the forming operation that occurs in blow molding.

Typically in the use of these machines a continuous product such as corrugated pipe or flexible pipe is produced. With such a product the output of the machine is a continuous length of product and each portion of the product is a repetition. For this type of product the clam shell halves are identical and the clam shell halves rotate through a track during which the object is formed and a return track through which the clam shell halves pass for return and reuse.

In order to manufacture the deck boards and stringers of the pallet of this invention which do not have a uniform cross-section, it is only necessary to configure the specific clam shell halves to meet the desired cross-sectional configuration. There is nothing in the basic operation of so-called continuous extrusion corrugating machines that requires that subsequent pairs of clam shell halves have the same configuration. Thus, the deck boards and stringers may be made from pairs of clam shell halves with as many clam shell halves as desired to produce the configuration so that structures as disclosed above, regardless of the joint mechanism selected may be made in such a continuous extrusion machine. The clam shell halves that come together to form the end of the stringer or end of the deck board respectively simply form a pinch as shown at 220. The pinch then creates the closed end of one piece that is being formed and the closed end of the next piece to be formed. The same process, of course, can be used with respect to the stringers and deck boards although different sets of molds will be required.

Figure 14:
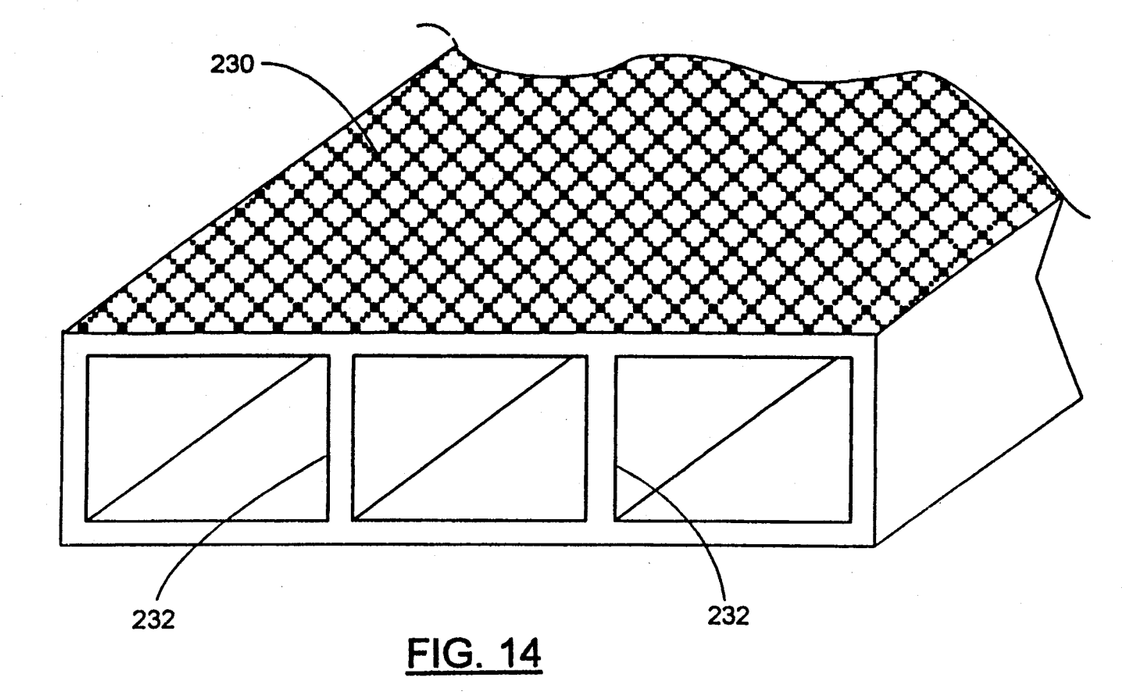
FIG. 14 illustrates an alternative deck board for use in the pallet of this invention.

With the use of an extrusion type of machine, various other configurations may be used for the deck board. In the blow molding technology usually employed, high pressure air is injecting into the part to be blow molded. This requires that there be a single continuous air chamber throughout the part to be molded. With the extrusion machine as discussed above and using a vacuum to form the exterior walls and surfaces there need not be a single continuous internal air chamber. This process may thus be used to form a deck board 230 of the type shown in FIG. 14. The principal difference between the deck board shown in cross-section in FIG. 14 and the deck boards previously discussed is that the deck board may be formed with continuously extending ribs 232 which extend the length of the deck board and which thereby divide the internal cavity of the deck board into a plurality of air chambers. In the embodiment shown in FIG. 14 the internal reinforcing comprises two ribs extending between the top and bottom surfaces of the deck board perpendicular to those surfaces. It will be obvious to those skilled in this art that any configuration of ribs including triangulation may be employed, all of which may be routinely extruded from an extrusion nozzle and then formed in the continuous extrusion process referred to above.

The above description is intended in an illustrative rather than a restrictive sense and variations to the specific configuration and materials described may be apparent to skilled persons in adapting the present invention to specific applications. Such variations are intended to form part of the present invention insofar as they are within the spirit and scope of the claims below.

I claim:

1. A pallet of the type having at least two elongate stringers, a plurality of elongate deck boards extending generally transversely between said stringers, and means for connecting said deck boards to said stringers, the improvement comprising each of said stringers and each of said deck boards being of thin walled hollow construction closed at the top, bottom, sides, and ends, and each of said stringers having spaced apart top and bottom surfaces and a web portion extending therebetween, and said web portion of said stringers comprises spaced longitudinal side walls extending between said top and bottom surfaces, said side walls meeting to form discrete areas of double wall thickness to strengthen said stringers.

2. The pallet of claim 1 wherein said stringers and deck board are constructed from the group of materials consisting of non-cellulosic and non-metallic materials.

3. The pallet of claim 2 wherein said material comprises a thermoplastic polymer material.

4. The pallet of claim 3 wherein at least a part of said thermoplastic material comprises a recyclable material.

5. The pallet of claim 4 wherein:
said connection means includes:
(i) means for positively locating each of said deck boards on said stringers, said locating means comprising a first locating portion on said top surface of said stringers and a second locating portion at least at each end of said deck boards, wherein each pair of said first and second locating portions are adapted to mate to prevent movement of each of said deck boards transversely off said stringers; and
(ii) means for fastening each of said deck boards to said stringers.

6. The pallet of claim 5 wherein said stringer includes at least one opening for accepting the tines of a fork-lift.

7. The pallet of claim 5 wherein each of said deck boards comprises spaced apart, generally planar top and bottom members and side walls extending therebetween to form a closed hollow unit, said top and bottom members meeting to form areas of double wall thickness to strengthen each said deck board.

8. The pallet of claim 7 wherein said first locating portion of said locating means comprises a land protruding from the respective top and bottom surfaces of said stringers, and said second locating portion comprises a groove in the bottom planar member extending transversely across the width of said deck board for fitting onto said land.

9. The pallet of claim 8 wherein said land extends along the length of said stringer on said top surface.

10. The pallet of claim 8 wherein said top and bottom members of said deck board meet along a portion of said groove to form areas of double wall thickness.

11. The pallet of claim 10 wherein at least a part of said area of double wall thickness of the top and bottom members of said deck board is located intermediate the top and bottom members to form a channel in said top member, and wherein said fastening means comprises at least one screw for insertion into said channel to fasten the deck board to said land.

12. The pallet of claim 7 wherein said first locating portion of said locating means comprises a rib projecting from the top surface of said stringer and said second locating portion comprises a wall of said deck board and said fastening means comprises at least one screw passing through said rib and into said wall.

13. The pallet of claim 7 wherein said first locating portion comprises a rib projecting from said top surface of said stringer, said rib including a hinge for folding said rib and said second locating portion comprises a groove in said deck board and said fastening means comprises at least one screw passing through said groove, through said rib and into said top surface of said stringer.

14. The pallet of claim 7 wherein said first locating portion comprises a rib projecting from said upper surface of said stringer, said rib having a narrow portion adjacent said upper surface and a barbed portion, and said second locating portion comprises a hole defined in said deck board, said hole having a narrow portion to closely receive said narrow portion of said rib and said hole having at least one land to contact said barbed portion.

15. The pallet of claim 14 wherein said rib is hollow.

16. The pallet of claim 14 wherein said rib is solid.

17. The pallet of claim 7 wherein said first locating portion comprises a rib on the upper surface of said stringer and a slot located in a wall of the stringer and said second locating portion comprises a flange extending from said deck board, said flange having a barb engaging said slot.

18. The pallet of claim 7 wherein said first locating portion comprises a plurality of T-shaped ribs on said upper surface of said stringer and said second locating portion comprises a raised rib and a channel on said upper surface of said deck board and wherein said fastening means comprises an interlocking member which engages said deck board and said T-shaped ribs.

19. The pallet of claim 7 wherein said first locating portion comprises a rib extending along said stringer, said rib comprising trapezoidal sections and rectangular sections and said second locating portion comprises a channel extending across the width of said deck board, said channel comprising rectangular sections and trapezoidal sections which are sized to interlock with said trapezoidal sections of said rib.

20. The pallet of claim 19 wherein said rib further comprises wedge shaped barbs and said channel comprises a trough with ends to engage said barbs when said deck board is fixed to said stringers.

* * * * *